(12) United States Patent
Xu

(10) Patent No.: US 10,853,165 B2
(45) Date of Patent: Dec. 1, 2020

(54) FAULT RESILIENT APPARATUS AND METHOD

(71) Applicant: Arm Limited, Cambridge (GB)

(72) Inventor: Zheng Xu, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/281,388

(22) Filed: Feb. 21, 2019

(65) Prior Publication Data

US 2020/0272535 A1 Aug. 27, 2020

(51) Int. Cl.
*G06F 11/10* (2006.01)

(52) U.S. Cl.
CPC .................... *G06F 11/1004* (2013.01)

(58) Field of Classification Search
CPC .................................................. G06F 11/1004
See application file for complete search history.

(56) References Cited

U.S. PATENT DOCUMENTS

| | | | | |
|---|---|---|---|---|
| 7,254,748 B1* | 8/2007 | Wright | ............... | G06F 11/1064 711/108 |
| 7,304,873 B1* | 12/2007 | Gupta | ............... | G06F 11/1068 365/189.07 |
| 9,146,808 B1* | 9/2015 | Butler | ............... | G06F 11/1064 |
| 2005/0027932 A1* | 2/2005 | Thayer | ............... | G06F 12/1027 711/108 |
| 2005/0289295 A1* | 12/2005 | Shoham | ............ | G06F 11/1064 711/108 |
| 2006/0212426 A1* | 9/2006 | Shakara | ............... | H04L 45/00 |
| 2007/0115986 A1* | 5/2007 | Shankara | ............ | H04L 63/145 370/392 |
| 2011/0072320 A1* | 3/2011 | Miura | ............... | G06F 11/0724 714/54 |
| 2013/0283126 A1* | 10/2013 | Ramaraju | ............ | G06F 8/4442 714/763 |
| 2015/0283810 A1* | 10/2015 | Fang | ....................... | B41J 2/175 347/47 |

(Continued)

OTHER PUBLICATIONS

A. Gendler et al., "Don't Correct the Tags in a Cache, Just Check Their Hamming Distance From the Lookup Tag", 2018 *IEEE International Symposium on High Performance Computer Architecture*, Feb. 24-28, 2018, pp. 571-582.

*Primary Examiner* — Kyle Vallecillo
(74) *Attorney, Agent, or Firm* — Nixon & Vanderhye P.C.

(57) ABSTRACT

An apparatus for providing fault resilience has storage for providing a plurality of compare data blocks, and processing circuitry that performs, for each compare data block, a processing operation using the input data and the compare data block to produce a match condition indication for that compare data block. Performance of the processing operation for each compare data block should result in only one match condition indication indicating a match. Evaluation circuitry evaluates the match condition indications produced for the plurality of compare data blocks and is arranged, in the presence of only one match condition indication indicating a match, to perform a false hit check procedure in order to check for presence of a false hit. In the presence of the false hit, the evaluation circuitry produces an error indication as the outcome indication, but otherwise produces a hit indication as the outcome indication.

24 Claims, 17 Drawing Sheets

(56) References Cited

U.S. PATENT DOCUMENTS

| | | | |
|---|---|---|---|
| 2015/0293810 A1* | 10/2015 | Ramaraju | G06F 11/1064 |
| | | | 714/819 |
| 2016/0283316 A1* | 9/2016 | Abali | H03M 7/00 |
| 2016/0283317 A1* | 9/2016 | Abali | H03M 13/09 |
| 2017/0060438 A1* | 3/2017 | Igaue | G11C 15/04 |
| 2018/0232310 A1* | 8/2018 | Chang | G06F 12/0246 |
| 2019/0065494 A1* | 2/2019 | Abali | G06F 16/90344 |

\* cited by examiner

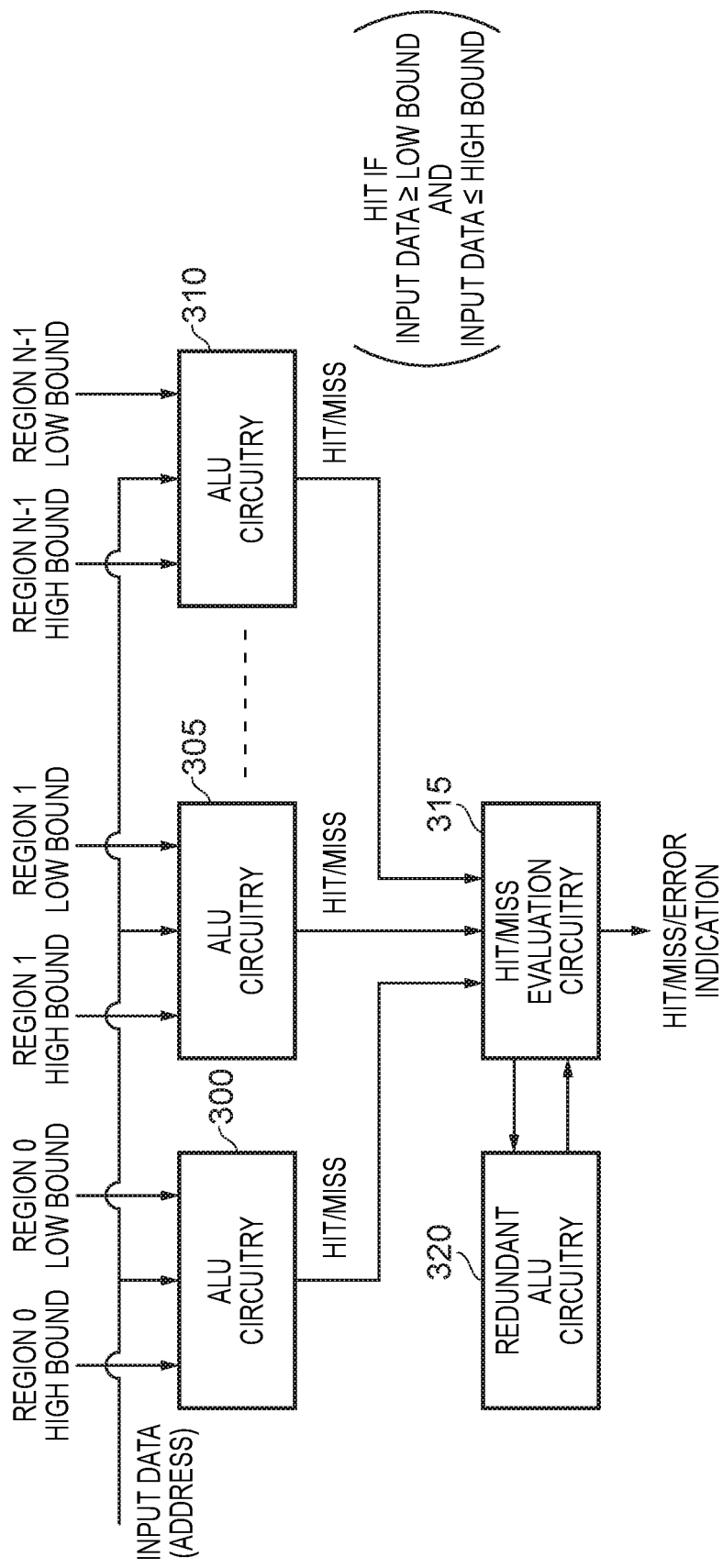

| DATA COMPARISON HIT | CHECKSUM COMPARISON HIT | CONCLUSION |
|---|---|---|
| ✓ | ✓ | HIT CONDITION |
| ✗ | ✗ | MISS CONDITION |
| ✓ | ✗ | ERROR CONDITION (FALSE HIT) |
| ✗ | ✓ | OPTION (1): ERROR CONDITION (FALSE MISS) <br><br> OPTION (2): REPLAY DATA COMPARISON TO DISTINGUISH BETWEEN ERROR AND MISS CONDITIONS |

FIG. 11

VARIANT WHERE INPUT DATA AND COMPARE DATA
MASKED BEFORE COMPARISON

PERFORM PROCESS OF FIGURE 8
BUT DATA COMPARISON
COMPARES MASKED INPUT DATA
WITH MASKED COMPARE DATA ⟶ 600
(IN CONTRAST, CHECKSUM COMPARISON
STILL USES GENERATED CHECKSUM FOR
FULL INPUT DATA AND STORED CHECKSUMS)

FIG. 13

| MASKED DATA COMPARISON HIT | CHECKSUM COMPARISON HIT | CONCLUSION |
|---|---|---|
| ✓ | ✓ | HIT CONDITION (MAY BE ERROR IN MASKED PORTION BUT NOT RELEVANT TO CURRENT CHECK) |
| ✗ | ✗ | MISS CONDITION (COULD BE ERROR IN MASKED PORTION BUT NOT RELEVANT TO CURRENT CHECK) |
| ✓ | ✗ | OPTION (1): ASSUME ERROR CONDITION (FALSE HIT) |
| | | OPTION (2): USE CHECKSUM TO DETERMINE LOCATION OF DATA BIT(S) GIVING RISE TO CHECKSUM MISMATCH (ERROR OR HIT DEPENDENT ON RESULT) |
| ✗ | ✓ | OPTION (1): ERROR CONDITION (FALSE MISS) |
| | | OPTION (2): REPLAY DATA COMPARISON TO DISTINGUISH BETWEEN ERROR AND MISS CONDITIONS |

FIG. 15

FAULT RESILIENT APPARATUS AND METHOD

BACKGROUND

The present technique relates to provision of fault resilience within an apparatus, and in particular relates to the design of an apparatus that can be used in functional safety implementations.

Functional safety is becoming an important aspect of modern data processing system design. In order to ensure designs meet the functional safety requirements, it is generally necessary to provide for a high level of fault detection coverage. Purely by way of example, in the automotive field the Standard ISO 26262 entitled "Road Vehicles—Functional Safety" is an international Standard for functional safety of electrical and/or electronics systems in production automobiles, and that Standard defines a number of Automotive Safety Integrity Levels (ASILs). ASIL D dictates the highest integrity requirements, and requires 99% fault detection (also referred to as Diagnostic Coverage).

Traditionally, designers resort to spatial redundancy such as Dual-Core-Lock-Step (DCLS) to achieve such high levels of fault detection. In accordance with such a design, two processor cores operate in lockstep and any discrepancy in their output is used to indicate an error. However, duplicating all of the components of the processor cores in such a design could potentially introduce significant area and power overhead. This is becoming a significant issue in modern systems, as more performance and features are added into those systems, resulting in an increase in the die size and power consumption.

Some commonly used functions within data processing systems are table lookup and address decoding functions. These typically involve the use of combinational circuitry to perform certain tasks to evaluate input data against table contents, for example to compare input data to compare data in multiple entries of a lookup table (LUT) or to perform address region determination. Such combinational circuitry would potentially need duplicating in such a functional safety system. However, there may be significant area and power consumption penalties associated with duplicating such circuitry.

It would accordingly be desirable to provide an improved technique for handling such functions within safety critical systems.

SUMMARY

In one example arrangement, there is provided an apparatus comprising: storage to provide a plurality of compare data blocks; processing circuitry responsive to receipt of input data to perform, for each compare data block, a processing operation using the input data and the compare data block to produce a match condition indication for that compare data block, the apparatus being configured such that, in expected operation, performance by the processing circuitry of the processing operation for each compare data block will result in one match condition indication indicating a match, and all other match condition indications indicating absence of a match; and evaluation circuitry arranged to evaluate the match condition indications produced for the plurality of compare data blocks in order to produce an outcome indication; wherein the evaluation circuitry is arranged, in the presence of one match condition indication indicating a match, and all other match condition indications indicating absence of a match: to perform a false hit check procedure in order to check for presence of a false hit; and in the presence of the false hit to produce an error indication as the outcome indication, and otherwise to produce a hit indication as the outcome indication.

In another example arrangement, there is provided an apparatus comprising: a storage region comprising a plurality of entries, each entry arranged to store compare data and checksum data for the compare data; comparison circuitry responsive to receipt of input data to perform, for each entry within the storage region, a comparison operation comprising comparing at least a portion of the input data with at least a corresponding portion of the compare data stored in that entry to produce a data match indication, and comparing checksum data generated from the input data with the checksum data stored in that entry to produce a checksum match indication; and evaluation circuitry arranged, for each entry, to evaluate both the data match indication and the checksum match indication in order to produce one of a hit indication, a miss indication and an error indication for that entry.

In a still further example arrangement, there is provided a method of detecting errors within an apparatus, comprising: maintaining in storage a plurality of compare data blocks; performing, responsive to receipt of input data, for each compare data block, a processing operation using the input data and the compare data block to produce a match condition indication for that compare data block, the apparatus being configured such that, in expected operation, performance of the processing operation for each compare data block will result in one match condition indication indicating a match, and all other match condition indications indicating absence of a match; and evaluating the match condition indications produced for the plurality of compare data blocks in order to produce an outcome indication, and in the presence of one match condition indication indicating a match, and all other match condition indications indicating absence of a match: performing a false hit check procedure in order to check for presence of a false hit; and in the presence of the false hit producing an error indication as the outcome indication, and otherwise producing a hit indication as the outcome indication.

In another example arrangement, there is provided a method of detecting errors in an apparatus comprising: providing a storage region comprising a plurality of entries, where each entry stores compare data and checksum data for the compare data; performing, responsive to receipt of input data, for each entry within the storage region, a comparison operation comprising comparing at least a portion of the input data with at least a corresponding portion of the compare data stored in that entry to produce a data match indication, and comparing checksum data generated from the input data with the checksum data stored in that entry to produce a checksum match indication; and evaluating, for each entry, both the data match indication and the checksum match indication in order to produce one of a hit indication, a miss indication and an error indication for that entry.

In a yet further example arrangement, there is provided an apparatus comprising: storage means for providing a plurality of compare data blocks; processing means for performing for each compare data block, responsive to receipt of input data, a processing operation using the input data and the compare data block to produce a match condition indication for that compare data block, the apparatus being configured such that, in expected operation, performance by the processing means of the processing operation for each compare data block will result in one match condition indication indicating a match, and all other match condition indications indicating absence of a match; and evaluation means for evaluating the match condition indications produced for the plurality of compare data blocks in order to produce an outcome indication; wherein the evaluation means is arranged, in the presence of one match condition indication indicating a match, and all other match condition indications indicating absence of a match: to perform a false hit check procedure in order to check for presence of a false hit; and in the presence of the false hit to produce an error indication as the outcome indication, and otherwise to produce a hit indication as the outcome indication.

In another example arrangement, there is provided an apparatus comprising: storage means comprising a plurality of entries, each entry for storing compare data and checksum data for the compare data; comparison means for performing for each entry within the storage means, responsive to receipt of input data, a comparison operation comprising comparing at least a portion of the input data with at least a corresponding portion of the compare data stored in that entry to produce a data match indication, and comparing checksum data generated from the input data with the checksum data stored in that entry to produce a checksum match indication; and evaluation means for evaluating, for each entry, both the data match indication and the checksum match indication in order to produce one of a hit indication, a miss indication and an error indication for that entry.

BRIEF DESCRIPTION OF THE DRAWINGS

The present technique will be described further, by way of illustration only, with reference to examples thereof as illustrated in the accompanying drawings, in which:

FIG. 5 illustrates an example of an apparatus in accordance with an alternative implementation that may be used to perform address region determination when the address regions are not size aligned;

FIG. 11 is a table indicating the conclusions reached dependent on the data comparison hit and checksum comparison hit information generated when employing the technique of FIGS. 8 and 9;

FIG. 13 is a diagram illustrating a variant of FIG. 8 where the input data and the compare data are subject to a masking operation before comparison;

FIG. 15 is a table illustrating the conclusions reached dependent on the masked data comparison hit and checksum comparison hit information, when employing the approach of FIG. 14.

DESCRIPTION OF EXAMPLES

Figure 1:
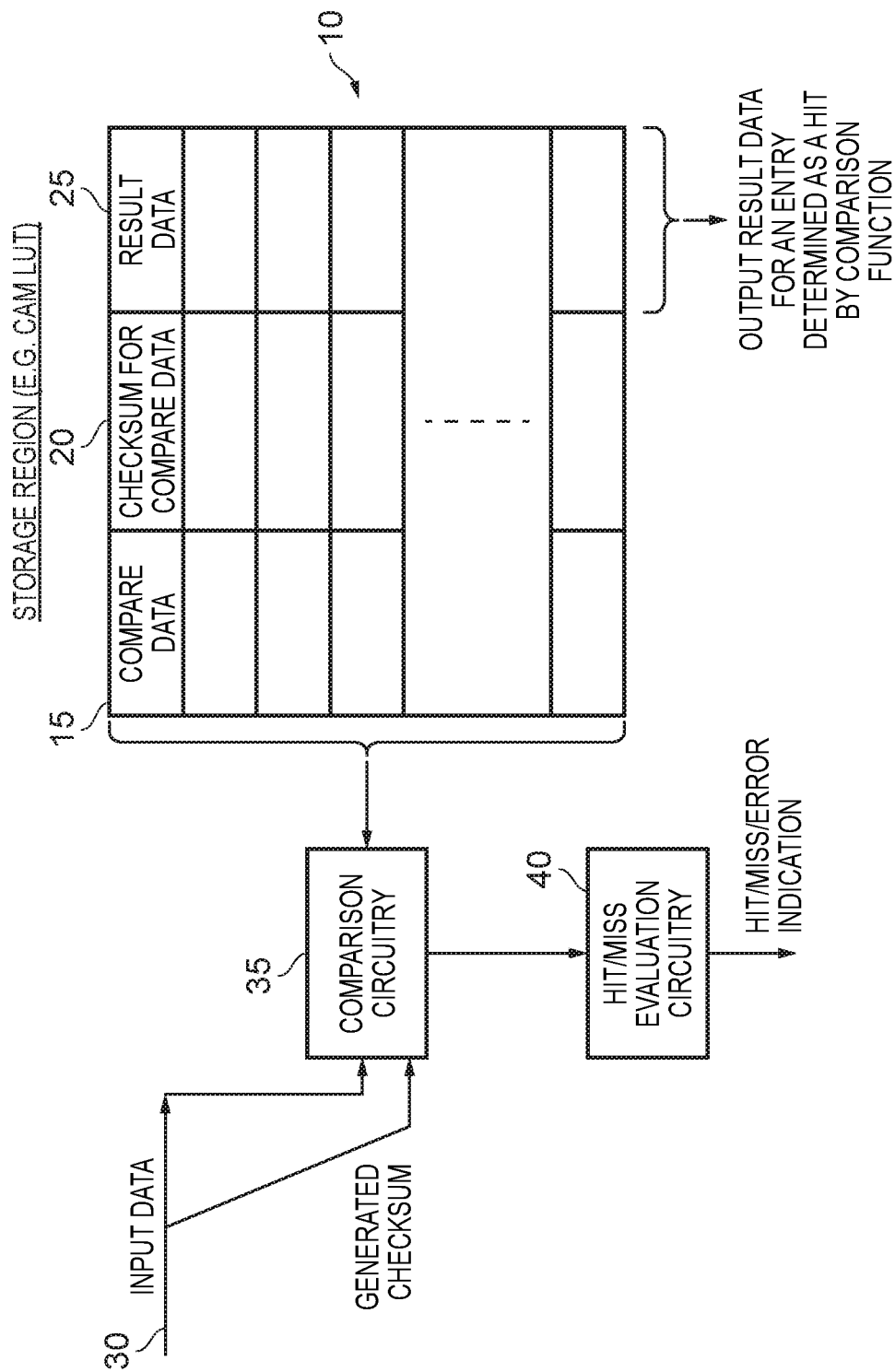
FIG. 1 is a block diagram of an apparatus in accordance with one example arrangement.

In one example arrangement, an apparatus is provided that has storage used to provide a plurality of compare data blocks, and processing circuitry that is responsive to receipt of input data to perform, for each compare data block, a processing operation using the input data and the compare data block to produce a match condition indication for that compare data block. During the normal expected operation of the apparatus, performance of the processing operation for each compare data block should result in one match condition indication indicating a match, and all other match condition indications indicating absence of a match. There are a variety of different components used within a data processing system where such a constraint should arise, for example when performing a route vector lookup using a transaction ID for a transaction response (where a mismatch could be due to a software programming error or a random hardware error), when performing an address region comparison within a Network-on-Chip (NoC) design, or when accessing a reorder buffer or rename registers in an out-of-order processor when the corresponding operation completes.

The apparatus also has an evaluation circuitry that is arranged to evaluate the match condition indications produced for the plurality of compare data blocks, in order to produce an outcome indication. The evaluation circuitry is arranged, in the presence of one match condition indication indicating a match, and all other match condition indications indicating absence of a match, to perform a false hit check procedure in order to check for presence of a false hit. Hence, rather than relying on the presence of a single match being detected (i.e. the expected outcome), a further check is performed to ensure that this match has not been produced due to a fault. In the presence of a false hit being detected by the false hit check procedure, the apparatus produces an error indication as the outcome indication, but otherwise will produce a hit indication as the outcome indication. Hence, by providing for provision of the false hit check procedure in situations where a single match is detected, this can provide robustness against faults, without needing to duplicate the processing circuitry, hence leading to a power efficient and area efficient design that can be used within safety critical systems.

The false hit may be caused by either a transient fault or a permanent fault. The wire or logic circuit failure may be referred to as a fault, whilst the symptom of the fault may then be referred to as an error. Hence transient or permanent faults may cause transient or permanent errors to be observed.

In one example arrangement, the evaluation circuitry is arranged, in the presence of more than one match condition indication indicating a match, to produce the error indication as the outcome indication. In particular, since the normal operation should produce a single match, then it is in such a situation immediately known that an error condition has arisen, and this can be signalled directly. The error may be due to a programming error or a random hardware fault, whether that be a transient fault or a permanent fault.

In one example arrangement, the evaluation circuitry is arranged, when none of the match condition indications indicates a match, to perform a false miss check procedure by causing the processing circuitry to reperform, for each compare data block, the processing operation using the input data and the compare data block to produce a duplicate match condition indication for that compare data block. Then the evaluation circuitry produces a transient error condition as the outcome indication when any of the duplicate match condition indications indicates a match. In particular, by reperforming the processing operation for all of the compare data blocks, then if the outcome is different that time around (i.e. a miss is not detected for every compare data block), then this indicates that the absence of a match during the initial performance of the processing operation was due to a transient error, and hence it is appropriate to raise the transient error indication.

However, if none of the duplicate match condition indications indicate a match, then this indicates that on two separate performances of the processing operation, no match has been detected. Accordingly, this may indicate that there is either a hard fault or a programming error. Depending on how long a transient error may persist, it may be deemed appropriate to repeat the above operation a defined number of additional times before concluding whether the error is due to a hard fault or a programming error rather than due to a transient fault. In one example arrangement, when it is concluded based on the above procedure that the error is not a transient error, the evaluation circuitry may be arranged to perform a further check procedure, and to produce as the outcome indication a programming error indication or a hardware fault indication dependent on the outcome of that further check procedure.

The processing operation performed by the processing circuitry can take a variety of forms, for example dependent on the type of information provided by each compare data block. In one example implementation, each compare data block comprises a single compare data item. In such an implementation, the processing circuitry may be arranged to perform, as the processing operation for each compare data block, a compare operation to compare the input data with the single compare data item of that compare data block.

In one such implementation, the storage circuitry may be arranged to provide, in association with each single compare data item, associated checksum data. This checksum data can then be used when performing the earlier discussed false hit check procedure. In particular, when a single match is detected, and the false hit check procedure is accordingly performed, then the evaluation circuitry may perform that false hit check procedure by causing checksum data generated for the input data to be compared with the checksum data for the single compare data item that triggered the match being detected, in order to produce a checksum match indication. In the event of a true hit, it would be expected that the checksum match indication would also produce a match. Accordingly, the evaluation circuitry determines the presence of a false hit when the checksum match indication does not indicate a match.

In one example implementation, the checksum data can also be used when performing the earlier-discussed further check procedure, i.e. to distinguish between a programming error or a hardware fault. In particular, the evaluation circuitry may be arranged to perform the further check procedure by, for each single compare data item, causing checksum data to be generated for that compare data item and compared with the stored checksum data. In the event that the generated checksum data does not match the stored checksum data for at least one single compare data item, the evaluation circuitry produces as the outcome indication a hardware fault indication, and otherwise produces as the outcome indication a programming error indication. In particular, at this point it is known that having performed two separate iterations of the processing operation, neither iteration produced the expected outcome of a single match, and further if there is at least one checksum mismatch detected when performing the further check procedure, this indicates a hard fault in the stored data. In contrast, if there was no checksum mismatch detected, then this would indicate that there is a programming error, in that the storage has been programmed with compare data blocks that have allowed no match to be detected for the input data.

The storage can take a variety of forms, but in one example implementation is arranged as content addressable memory (CAM). Hence, the storage can provide a plurality of entries, where each entry provides one of the compare data blocks, and the processing circuitry can then be arranged to perform the processing operation on the contents held in each of the entries of the content addressable memory.

The above described technique can hence be used in a wide variety of situations where the content addressable memory is arranged in such a way that it is expected that performance of the processing operation using the contents of the content addressable memory will produce a single hit. It will be appreciated for example that there are a wide variety of different lookup table (LUT) implementations where such a single hit would be expected. As one particular example, such an approach can be used when performing address decoding to determine a region in which an address resides, in situations where the address regions are size aligned, and accordingly the address region determination may merely require a comparison of an upper portion of the received address with a base address indication held in an entry of a lookup table.

However, the technique can also be used when performing a more generalised address decoding operation in order to determine the address region in which an address resides, in situations where the address regions are not necessarily size aligned. In that instance, the address decoding does not merely involve a comparison operation with a base address, and instead an arithmetic operation is required. However, the earlier described process can still be used to evaluate the outcome of the required processing operation, and in particular to detect error conditions.

For example, when performing the above more generalised address decoding operation, each compare data block may comprise bounds information for a memory region, for example defining upper and lower bounds of a memory region. The input data may then comprise a memory address, and the processing circuitry may be arranged to perform, as the processing operation for each compare data block, an arithmetic operation to determine, with reference to the bounds information, whether the memory address is within the associated memory region. In this example arrangement, the apparatus may comprise additional processing circuitry, and the evaluation circuitry may be arranged to perform the false hit check procedure by reperforming within the additional processing circuitry the arithmetic operation for the compare data block associated with the match condition indication indicating the match. This results in the production of a further match condition indication, and the evaluation circuitry will determine presence of a false hit when the further match condition indication indicates absence of a match.

Hence, in such an arrangement, redundant processing circuitry is provided in which the processing operation can be repeated for the one item of compare data that gave rise to the single match condition. If this again identifies a match, then this indicates a hit, but if it instead does not result in a match then this indicates the presence of an error.

As mentioned earlier, if no match is detected on a first pass, and the processing operation is then repeated on a second pass, and also results in no match, then a further check procedure can be implemented in order to seek to distinguish between a hardware fault and a programming error. In the above described implementation for performing address region determination for memory regions that are not size aligned, then the evaluation circuitry may be arranged to perform the further check procedure by employing the additional processing circuitry (i.e. the redundant processing circuitry) to reperform the arithmetic operation for each compare data block in order to produce a plurality of reference match condition indications. Whilst the main processing circuitry may be able to perform the arithmetic operation in parallel for all compare data blocks, the additional processing circuitry is primarily provided to perform the false hit check, and hence only needs to perform a single arithmetic operation. Thus, when reperforming the arithmetic operation for each compare data block as part of the further check procedure, it may be necessary for the additional processing circuitry to iteratively reperform the arithmetic operation for one compare data block at a time.

In the event that any of the reference match condition indications indicates a match, then this indicates a hardware fault in the original processing circuitry. However, if none of the reference match condition indications indicate a match, then this indicates a programming error.

As mentioned earlier, in many situations, the compare data blocks may comprise a single item of compare data, and a simple comparison operation may be all that is required in order to detect a match or absence of a match between each item of compare data and the provided input data. However, in some implementations it may not necessarily be the case that normal operation will only produce a single hit, and either or both of multiple hits, or a miss, may be a legitimate result. In such situations, an alternative mechanism to that described earlier can be utilised, whilst still avoiding the need to duplicate the combinational circuitry used within the apparatus.

For example, an apparatus may provide a storage region providing a plurality of entries, where each entry is arranged to store compare data and checksum data for the compare data. The apparatus may then have comparison circuitry that is responsive to receipt of input data to perform, for each entry within the storage region, a comparison operation comprising comparing at least a portion of the input data with at least a corresponding portion of the compare data stored in that entry in order to produce a data match indication. In addition, the comparison operation involves comparing checksum data generated from the input data with the checksum data stored in the entry in order to produce a checksum match indication. Hence, for every entry in the storage region, both a data match indication and a checksum match indication are produced. The evaluation circuitry is then arranged, for each entry, to evaluate both the data match indication and the checksum match indication in order to produce one of a hit indication, a miss indication and an error indication for the entry.

In one example implementation, the evaluation circuitry is arranged to produce the hit indication for the entry when both the data match indication and the checksum match indication indicate a match. Similarly, the evaluation circuitry may produce a miss indication for the entry when both the data match indication and the checksum match indication indicate absence of a match (also referred to herein as a miss).

However, when the data match indication indicates a match, but the checksum match indication indicates absence of a match, then for that entry the evaluation circuitry may be arranged to produce the error indication. In particular, it is assumed that the match that was detected when comparing the input data and the compare data was due to a permanent fault, or due to a transient fault as a result of a Single Event Upset (SEU) or Single Event Transient (SET) fault.

In one example implementation, when the data match indication indicates absence of a match, but the checksum match indication indicates a match, then the evaluation circuitry may be arranged to produce the error indication for the entry. This may be appropriate in implementations where it is considered that the chance of checksum aliasing (i.e. where two different items of compare data produce the same checksum) is quite rare. In such an instance, the absence of a data match, whilst obtaining a checksum match, can be considered to be a false miss, due to a single event upset in the data at the time the comparison operation was performed.

However, in an alternative implementation, rather than assuming the false miss when a data match is not observed but a checksum match is, then instead the evaluation circuitry may be arranged to cause the comparison circuitry to reperform the comparing of the at least a portion of the input data with the at least a corresponding portion of the compare data stored in the relevant entry, in order to produce a duplicate data match indication. If the duplicate data match indication still indicates a miss, then the evaluation circuitry is arranged to produce the miss indication for the entry in question, but otherwise it produces the error indication. In particular, in the latter case it is assumed that an SEU occurred during the original comparison of the data, and it was the SEU that resulted in the original miss.

In an alternative implementation, rather than performing the above described steps when the data match indication and the checksum match indication differ, an alternative approach can be taken. In particular, in one example implementation, when the data match indication and the checksum match indication differ, the evaluation circuitry may be arranged to analyse a number of logic 1 values in the data match indication and the checksum match indication in order to determine whether the error indication is to be produced.

In particular, when the data match indication and checksum match indication are considered together, if there is only a single logic 1 value present then the error indication will be produced, since this indicates a situation where a random hardware error has occurred, giving rise to either a false hit or a false miss. However, if more than one logic 1 value is present, then in one example implementation the data match indication is used to determine whether to produce the hit indication or the miss indication.

In one example implementation, the comparison operation may involve comparing all of the input data with all of the compare data stored in the entry, when producing the data match indication. However, in an alternative implementation the input data may be subjected to a mask operation to produce a subset of the input data, and then for each entry the comparison operation may comprise comparing the subset of the input data with the corresponding subset of the compare data stored in that entry in order to produce the data match indication. This further increases the scenarios in which the present technique may be utilised. For instance, in some CAM lookup schemes the input to the process is both input data and a mask.

In instances where the comparison involves comparing a subset of the input data with a subset of the compare data, the evaluation circuitry may be arranged, when the data match indication indicates a match, but the checksum match indication indicates absence of a match, to employ the checksum data to identify a location within the input data that gave rise to the checksum match indication indicating absence of the match. Then the evaluation circuitry may produce the error indication when the location is within the subset of the input data, and otherwise to produce the hit condition. Hence, if it can be determined that the only reason the checksum comparison did not produce a match was due to differences in the input data and the compare data that were not actually compared, taking into account the mask, then it can be determined at that point to produce the hit indication, since those differences in the data are not relevant to the present check being performed. However, otherwise the error indication will be produced. The checksum data used to identify the location within the input data that gave rise to the checksum match indication indicating absence of the match may be the stored checksum for the compare data, or the generated checksum for the input data.

The storage region with which the above described techniques are utilised can take a variety of forms. For example, the storage region may form a lookup table, such as for example used to form the tag comparison part of a content addressable memory. As another example, the storage region may be a fully associative cache, or a selected set within a set associative cache. In particular, once the set within a set associative cache has been identified, then the comparison operation is performed with regard to each entry within that selected set.

Particular examples will now be described with reference to the Figures.

FIG. 1 schematically illustrates an apparatus in accordance with one example implementation. A storage region 10 is provided that in one example takes the form of a content addressable memory (CAM), and in particular may form a lookup table (LUT) used within a data processing system. The storage region 10 has a plurality of entries, where each entry includes compare data 15, and optionally some additional fields. In the particular example illustrated, a checksum 20 is also provided for each item of compare data 15, and in addition result data 25 may be specified.

Comparison circuitry 35 is arranged to perform a compare operation using input data 30 and the contents of the LUT. In particular, the input data 30 is compared with each item of compare data 15 in order to determine if there is a match between the compare data and the input data. The comparisons can be performed in parallel in one example implementation, and result in the generation of match condition indications produced for each entry of the LUT 10, which are output to the evaluation circuitry 40. Using the techniques that will be discussed in more detail herein, the evaluation circuitry 40 can determine whether there is a hit condition detected within the LUT, a miss condition detected within the LUT, or an error condition detected. In the event of a hit being detected in an entry, then the result data 25 within that entry can be accessed. The form of the result data may vary dependent on the type of LUT, and whilst in some instances it may be the case that the result data is read from a hit entry, it will also be appreciated that in different instances data may be written into the result data field 25 for the entry that results in a hit. Also, in some implementations, there may be no specific result data associated with each entry, and instead the result of the comparison operation is merely to detect the entry for which a hit is detected, that information itself representing the result.

As will be apparent from the following discussion of example implementations, in some situations the comparison circuitry may also compare items of checksum data 20 against the equivalent checksum generated from the input data 30, with that information also being used by the evaluation circuitry 40.

In one example implementation, the lookup table 10 is of a type where, during normal operation of the apparatus, it is expected that the comparison operation performed by the comparison circuitry 35 will result in a hit being detected in one of the entries. In particular, it is not expected that there will be more than one hit, and also it is not expected that there will be a miss. It will be appreciated that there are many different types of lookup table where this constraint may be expected. For example, when performing address decoding to determine a memory region within which an input address resides, where those regions are size aligned, the compare data 15 may take the form of a base address, and it may be expected that the address will reside within one, but only one, region. If a memory region is size aligned, this means that an address falling within the region will have a first (most significant) address portion that is common to all addresses falling with the region, and a second (least significant) address portion that can take any value between "0 . . . 0" and "1 . . . 1" (the size of the second address portion being dependent on the size of the memory region).

As another example where the above constraint may be expected, when performing route vector lookup within a Network-on-Chip, using a transaction ID as input data for a transaction response, it will be expected that a single hit will be detected. As yet a further example, in out-of-order processing systems, there will be a number of lookup table structures which will conform to such a requirement in normal operation. For example, when accessing a register rename storage structure using an architectural register at the time when execution of an instruction completes, it will be expected to find a hit within a single entry, identifying the corresponding physical register currently mapped to that architectural register. Similarly, for the reorder buffer tracking instructions currently in flight within the out-of-order processor, at the time execution of an instruction completes a lookup into the reorder buffer in order to write therein the results and control information will be expected to identify a single entry that matches for the input data. This is similar to a request/response handshake in a system, where when a response comes back identifying a transaction ID, this should identify one and only one entry in the transaction tracking logic.

Figure 2A:
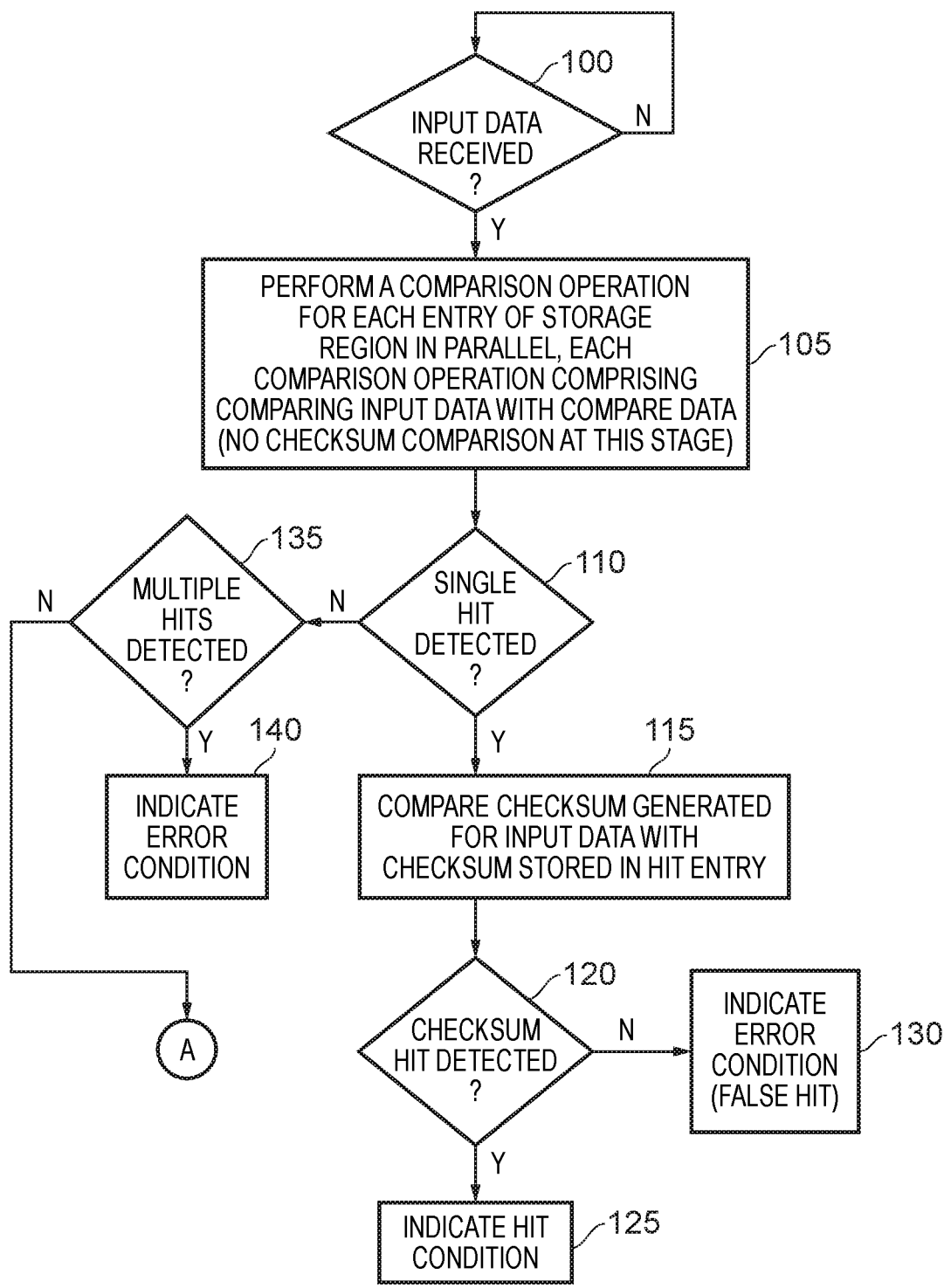
FIGS. 2A and 2B provide a flow diagram illustrating the operation of the apparatus of FIG. 1 in one example.
Figure 2B:
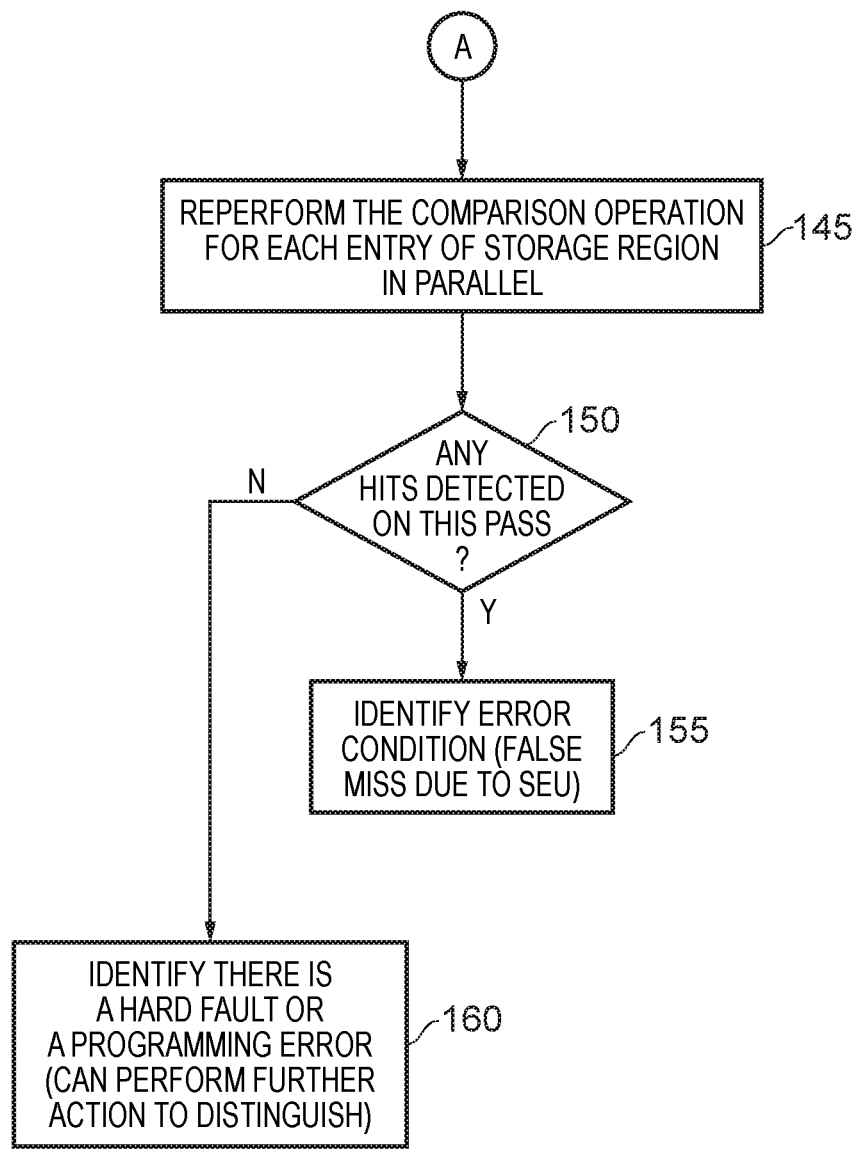

FIGS. 2A and 2B provide a flow diagram illustrating the operation of the apparatus of FIG. 1 in one example implementation where it is indeed expected that the storage region will produce a single hit when subjected to a lookup operation by the comparison circuitry 35, with a miss or multi-hit being considered to be a programming error or a malfunction of the hardware. At step 100, it is determined whether some input data has been received by the comparison circuitry 35, and if so the process proceeds to step 105 where a comparison operation is performed for each entry of the storage region 10. This comparison operation is in this example performed in parallel, and each comparison operation involves comparing the input data with the compare data in the associated entry. At this stage, no reference is made to the checksum information 20.

At step 110, it is determined whether a single hit has been detected, i.e. whether the expected behaviour has been observed. If so, then in order to provide resilience to faults, whether a transient fault such as may be caused by single event upsets (SEUs) or a permanent fault causing a permanent error, it is appropriate to ensure that the hit was not a false hit. In the example illustrated in FIG. 2A, this is determined at step 115 by comparing the checksum stored in the hit entry with corresponding checksum information generated from the input data 30. It is then determined at step 120 if a checksum hit has been detected, and if so then the hit condition is indicated at step 125. As discussed earlier, at this point this may result in access to the associated result data 25 for the hit entry.

However, if the checksum comparison does not produce a hit, then this indicates an error condition at step 130. In particular, it is at this point considered that the hit previously detected at step 110 was due to a false hit error. It should be noted that the fault may be in either the compare data or the comparison logic.

If at step 110 it is determined that there is not a single hit, then at step 135 it is determined whether there are in fact multiple hits detected, which is not expected behaviour. If so, then an error condition is signalled at step 140. The error detected here may be due to a random hardware fault or a programming error. A random hardware fault may be either transient or permanent.

If at step 135 multiple hits are not detected, then this means that no hits have been detected, which is not expected behaviour. However, in accordance with the techniques described herein a further check is performed in order to check whether the absence of a hit was due to a false miss, caused by a single event upset. In particular, as shown in FIG. 2B, at step 145 the comparison operation is re-performed for each entry of the storage region in parallel, hence repeating the process discussed earlier with reference to step 105. It is then determined at step 150 whether any hits have been detected on this second pass. If so, then this indicates a discrepancy between the first pass of the comparison operation and the second pass, indicating the presence of a single event upset. Accordingly, at step 155 an error condition is identified, to indicate the presence of a transient error, and in particular a transient error giving rise to a false miss.

If at step 150 there are still no hits detected, then provided the time of persistence of a transient error has passed (which is assumed to be the case in FIG. 2B) this means that the problem is not due to a transient error, and instead at step 160 it is identified that there is either a hard fault or a programming error. If the transient error may still be present, step 145 can be re-performed one or more additional times before concluding whether there is a hard fault or a programming error rather than the issue having been caused by a transient error.

In some instances, if step 160 is reached, it may be sufficient merely to identify that there is a hard fault or a programming error. However, if desired a further check can be performed in order to seek to distinguish between a hard fault and a programming error. An example of a process that can be used for this purpose is discussed with reference to FIG. 3.

In particular, at step 200, for each entry in the storage region 15, a checksum is regenerated from the compare data 15 stored therein, and then the regenerated checksum is compared with the stored checksum. This process can be performed iteratively if desired, for each entry in the storage region 10.

At step 205, it is then determined whether any entry has mismatching checksums. If that is not the case, then it is known that there is a true miss, and therefore a programming error since the correct operation should not result in a miss. Accordingly, at step 215 a programming error can be identified.

However, if any of the entries have mismatching checksums, then this indicates that the miss was due to a hardware fault, and accordingly a random hard fault is identified at step 210.

By such an approach, it will be appreciated that resilience to errors can be provided without needing to replicate the combinational circuitry used in association with the lookup table. This can provide a particularly area efficient solution suitable for use in safety critical systems.

Figure 3:
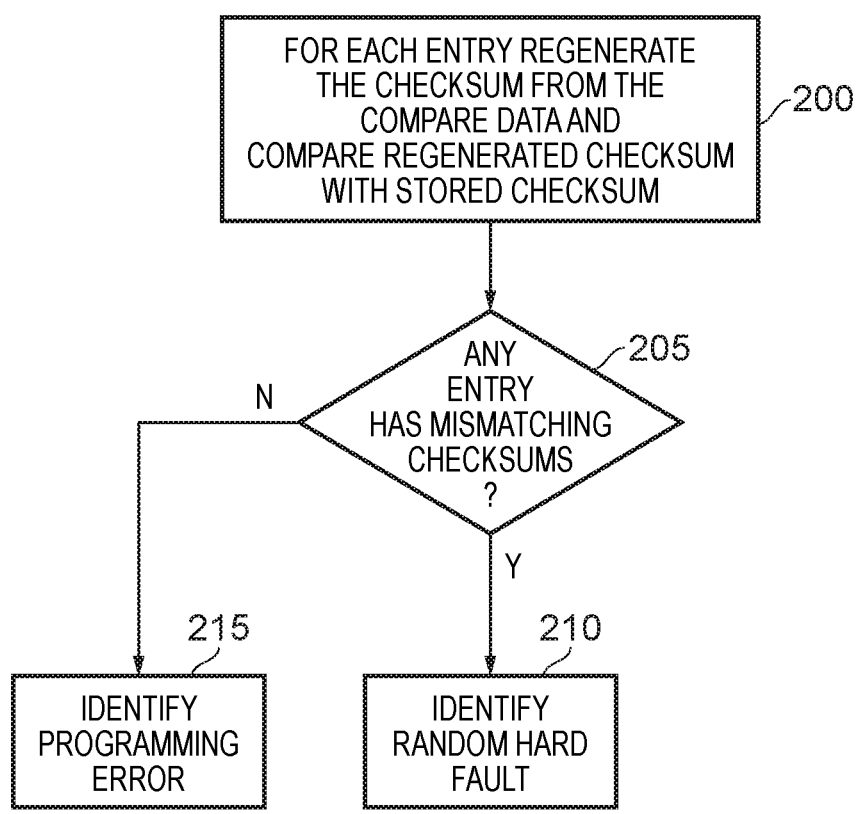
FIG. 3 is a flow diagram illustrating steps that can be performed to implement the final step of FIG. 2B in accordance with one example.
Figure 4:
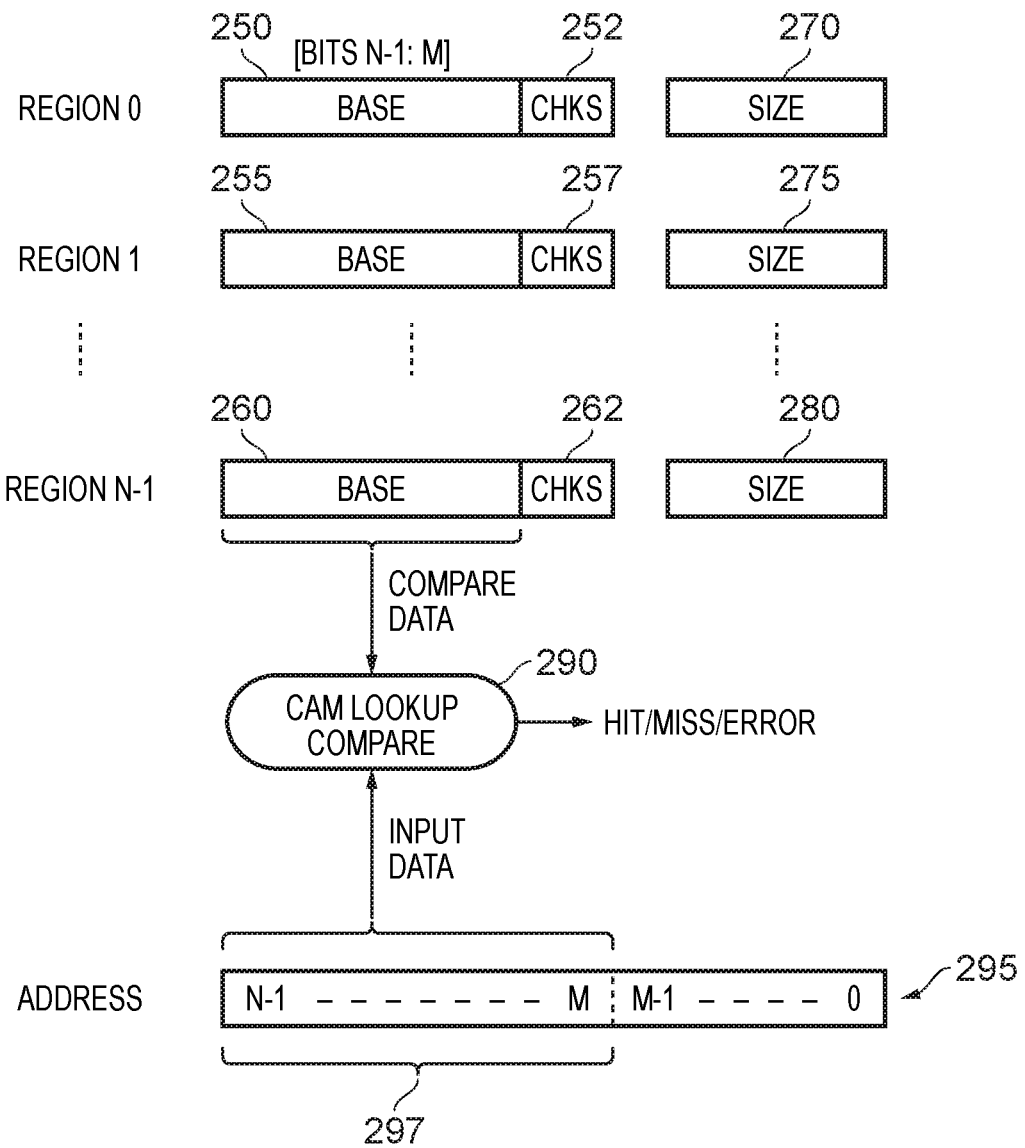
FIG. 4 illustrates how the techniques described with reference to FIGS. 1 to 3 can be used to perform address region determination when the address regions are size aligned.

As mentioned earlier, one use case for the approach described with reference to FIGS. 1 to 3 is when performing address decoding to determine a region in which an input address resides, in situations where the address regions are size aligned. In such instances, each region can be defined by a base address 250, 255, 260 and associated size information 270, 275, 280, as shown in FIG. 4. The base address can actually be specified by a certain number of most significant bits N-1 through to M, and the remaining M least significant bits from bits M-1 to 0 do not need to be specified. In particular, because of the size alignment, it is known that the M least significant bits can take any value from all 0s and all 1 s. Hence, when detecting whether a specified address 295 resides within a particular address region, it is only necessary to consider the most significant bits N-1 through M 297 of the address 295. In particular, those bits 297 form the input data 30 shown in FIG. 1 and the compare data 15 in each of the entries of LUT 10 are formed by the base address portions 250, 255, 260 shown in FIG. 4. For each base address indication 250, 255, 260, corresponding checksum data 252, 257, 262 can be generated and stored as the checksum information 20 within each entry of the table 10.

As a result, in order to determine which region an input address resides in a CAM lookup comparison operation 290 can be performed, using the process discussed earlier with reference to FIGS. 2A and 2B, resulting in the generation of a hit, miss or an error condition.

When the address regions are not size aligned, then the process of performing address decoding in order to determine which address region an input address resides in becomes more complicated than merely performing a comparison, but as will be discussed hereafter with reference to FIGS. 5 to 7, it is still possible to perform a similar process in order to implement a fault resilient mechanism for performing such address decoding, without the need to replicate fully the address decoding circuitry.

As shown in FIG. 5, each region is in this case specified by bounds information, which can for example take the form of a high bound and a low bound for each region. Arithmetic logic unit (ALU) circuitry 300, 305, 310 is provided to enable a processing operation to be performed in parallel for each of the regions, using supplied input data, in this case the input data being an address for which it is required to determine the region in which this address resides. It will be understood that the address will lie within a particular region if that address is greater than or equal to the low bound and also less than or equal to the high bound of the associated region. Each of the ALU circuits 300, 305, 310 performs the necessary processing operation to evaluate that condition, resulting in the generation of a hit or a miss from each ALU circuit. As with the earlier discussed examples, in normal operation there should be a hit for one region, with all other regions resulting in a miss. The evaluation circuitry 315 is provided for analysing the various hit/miss information from the plurality of ALU circuits 300, 305, 310, in order to produce a hit indication, a miss indication or an error indication. During this process, the evaluation circuitry 315 has access to redundant ALU circuitry 320, which in one implementation is constructed identically to any one of the ALU circuits 300, 305, 310, and hence can be used to re-perform the processing operation for a selected region in order to determine whether the input address is considered to reside within that region.

Figure 6A:
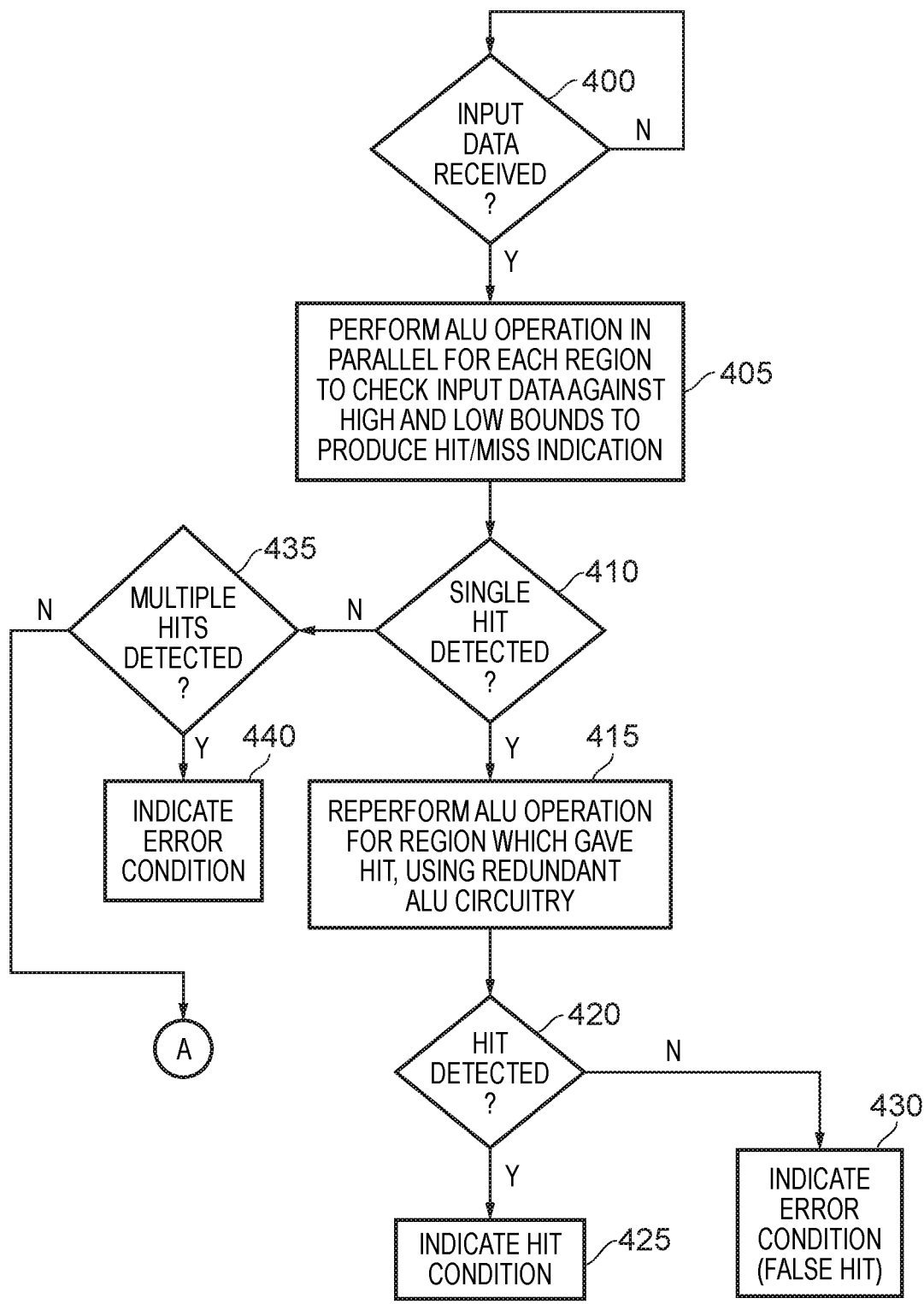
FIGS. 6A and 6B provide a flow diagram illustrating the operation of the apparatus of FIG. 5 in accordance with one example.
Figure 6B:
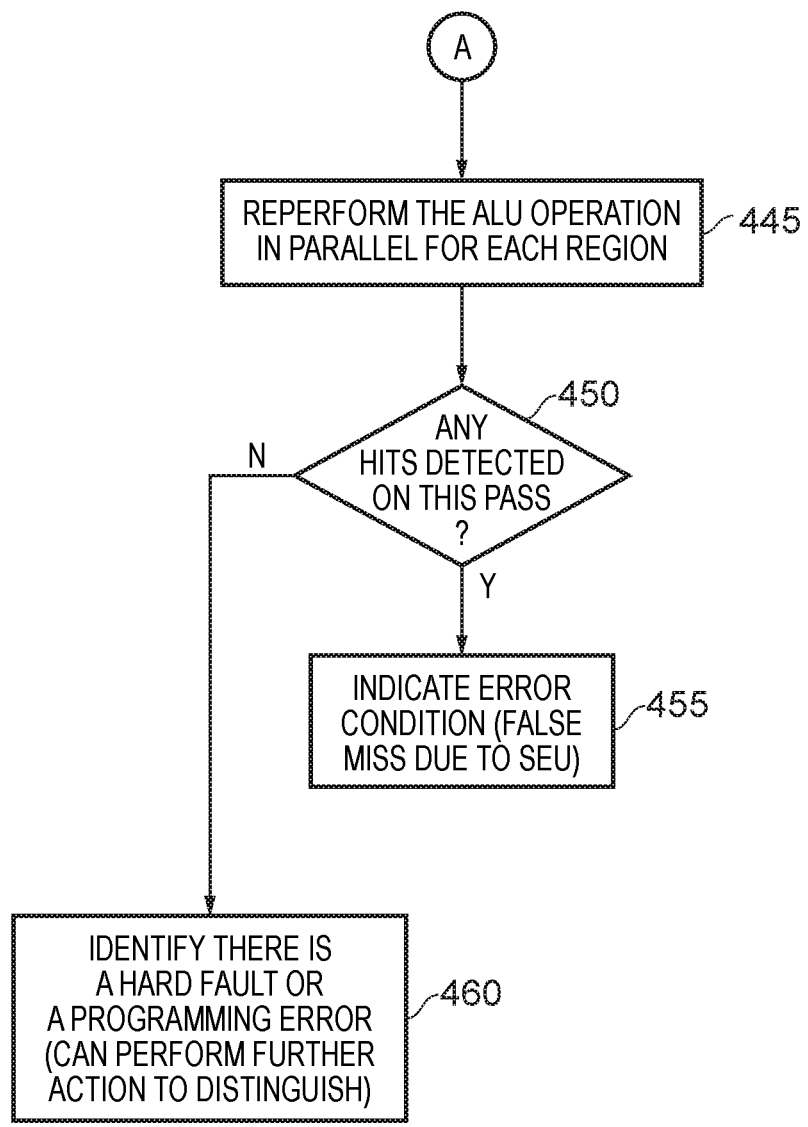

FIGS. 6A and 6B are a flow diagram illustrating the operation of the apparatus of FIG. 5 in one example implementation. At step 400 it is determined whether an item of input data has been received, i.e. whether an address has been received. If so, then at step 405 an arithmetic operation is performed in parallel for each region, using the ALU circuits 300, 305, 310, to check whether the input address falls within the high and low bounds for the associated memory region, thus causing a hit or miss indication to be produced for each region.

At step 410, it is determined whether a single hit has been detected, i.e. whether the expected behaviour has been observed. If so, then as per the process discussed earlier with reference to FIG. 2A, it is appropriate to perform an additional check in order to seek to discount situations where the hit is due to a false hit. In this implementation, there is no checksum information to be used at this stage, but instead the required ALU operation is re-performed at step 415 using the redundant ALU circuitry 320, for the region which gave rise to the single hit being detected at step 410. It is then determined at step 420 whether a hit is detected when the ALU operation is re-performed, and if so then the hit condition is indicated at step 425. However, if a hit is no longer detected when using the redundant ALU circuitry 320 then it is assumed that the original hit was a false hit, and accordingly an error condition is indicated at step 430.

If at step 410 it is determined that a single hit was not detected, then at step 435 it is determined whether multiple hits have been detected, and if so an error condition is indicated at step 440. The error detected here may be due to a random hardware fault or a programming error. A random hardware fault may be either transient or permanent.

If at step 435 it is determined that there are not multiple hits, then this means that no hit has been detected by virtue of the operations performed at step 405. Accordingly, as with the process discussed earlier with reference to FIGS. 2A and 2B, it is appropriate to seek to perform an additional check to see whether the absence of a hit was due to a false miss scenario, brought about by a SEU. In the example illustrated in FIG. 6B, this is achieved at step 445 by re-performing the arithmetic operation in parallel for each region. At this point, the ALU circuits 300, 305, 310 are used again for this purpose. It is then determined at step 450 whether any hits were detected on this pass. If so, this indicates a discrepancy between the first pass and the second pass, and accordingly an error condition is indicated at step 445, to identify that a false miss occurred due to a single event upset.

If at step 450 it is determined that again no hits have been detected, then provided the time of persistence of a transient error has passed (which is assumed to be the case in FIG. 6B) this indicates that there is either a hard fault or a programming error, and this is identified at step 460.

Figure 7:
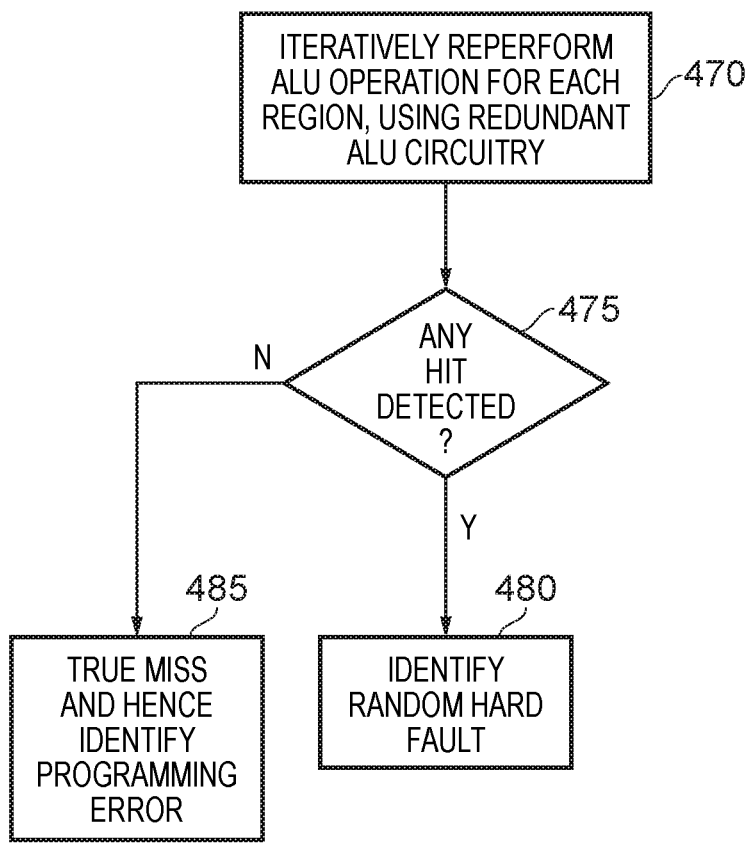
FIG. 7 is a flow diagram illustrating steps that may be performed to implement the final step of FIG. 6B in accordance with one example.

As per the discussion earlier of step 160 of FIG. 2B, if desired a further check procedure can be performed to seek to distinguish between a hard fault or a programming error, and in one example implementation this can be performed using the process of FIG. 7.

At step 470, the arithmetic operation for each region is re-performed iteratively, using the redundant ALU circuitry 320. As mentioned earlier, the redundant ALU circuitry 320 replicates one of the individual ALU circuits 300, 305, 310 and hence can only perform the arithmetic operation for one particular region at a time. However, the benefit here is that by performing the operation using a different piece of circuitry to that which was used during the earlier first and second passes, then this can assist in distinguishing between a hard error and a programming fault. In particular, if at step 475 it is determined that at least one hit has been detected, then this indicates the presence of a random hard fault that has caused the absence of a hit when using the ALU circuits 300, 305, 310, and this is identified at step 480. However, if no hits are detected, even though the redundant ALU circuit 320 has been used instead of the original ALU circuits 300, 305, 310, then this indicates the presence of a true miss, and thus a programming error is identified at step 485.

When adopting the approach discussed above with reference to FIGS. 5 to 7, this can give rise to significant area savings for the address range check hardware when compared with full duplication of the circuitry, as the arithmetic operations can potentially be expensive in terms of area requirement for the circuitry involved.

Returning to the general lookup table scenario discussed earlier with reference to FIG. 1, then it will be appreciated that some instances of lookup tables used within the data processing system will not necessarily be expected to always give rise to a single hit, and instead it may be perfectly legitimate for a miss to occur or even in some instances for multiple hits to occur. Examples of CAM lookup operations that may legitimately produce misses are lookups in translation lookaside buffers (TLBs), tag comparison lookups in a fully associative cache, or within a selected set of a set associative cache, etc.

Again, it would be desirable in a functional safety design to avoid the need to replicate the combinational circuits used in association with such table lookups. As discussed hereafter, a mechanism is provided that allows for fault resilience without replication of such circuitry.

Figure 8:
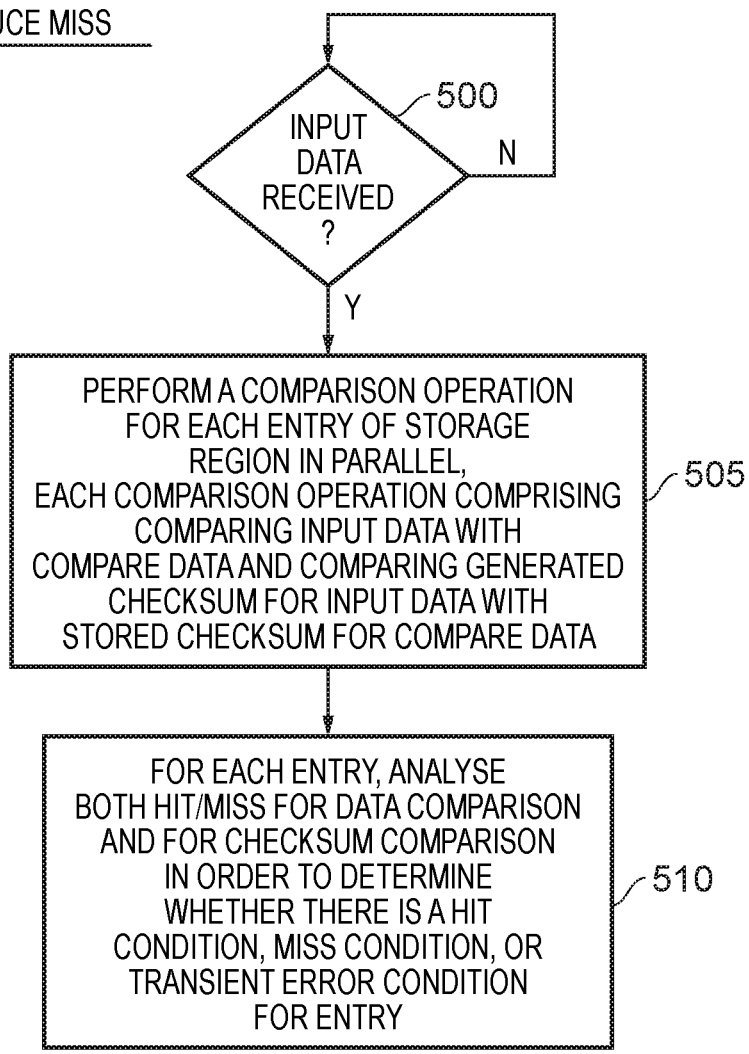
FIG. 8 is a flow diagram illustrating the operation of the apparatus of FIG. 1 in an example variant where the lookup comparison operation may legitimately produce a miss.

FIG. 8 is a flow diagram illustrating the operation of the circuitry of FIG. 1 in situations where the storage region will not necessarily be expected to always produce a single hit. At step 500, it is determined whether input data has been received, and if so then at step 505 a comparison operation is performed for each entry of the storage region in parallel. Each comparison operation comprises comparing the input data with the compare data, and also comparing a generated checksum for the input data with the stored checksum for the compare data. This results in both a data match indication and a checksum match indication for each entry. Then, at step 510, for each entry, the evaluation circuitry analyses both the hit/miss information for the data comparison and for the checksum comparison in order to determine whether there is a hit condition, a miss condition or a transient error condition for the entry.

The checksums used may take a variety of forms, depending on the type of error detection/correction to be facilitated for the compare data in the storage region. For example in some instances the checksums may take the form of error correction codes (ECCs) to allow for some degree of error correction, but in other examples the checksums may comprise simple parity bits to enable error detection.

Figure 9:
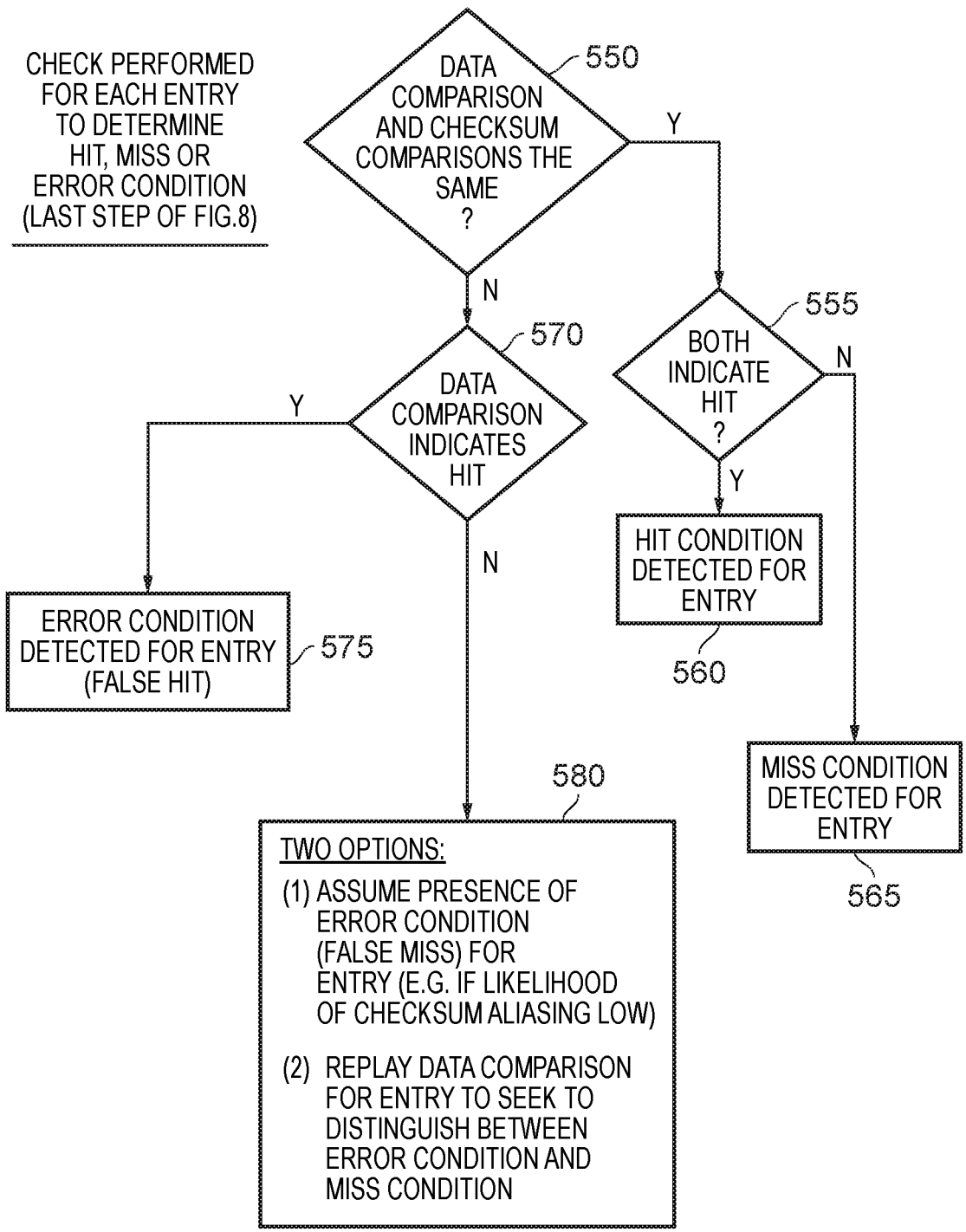
FIG. 9 is a flow diagram illustrating the steps performed to implement the final step of FIG. 8 in one example.

The steps performed by the evaluation circuitry 40 to implement the final step 510 of FIG. 8 is discussed in more detail with reference to FIG. 9, which illustrates one example approach. In particular, FIG. 9 illustrates the steps that may be performed when evaluating the data match indication and the checksum match indication for each entry. At step 550, it is determined whether the data comparison and the checksum comparison are the same, i.e. whether they both hit or both miss. If so, then at step 555 it is determined whether both have produced hit indications, and if so then at step 560 a hit condition is determined to have been detected for the entry. Conversely, if they both indicate a miss, then at step 565 a miss condition is detected for the entry.

If at step 550 it is determined that the data comparison and checksum comparison do not yield the same result, then at step 570 it is determined whether the data comparison indicates a hit. If so, then the process proceeds to step 575 where an error condition is detected for the entry. In particular, since the checksums did not match but the data comparison did yield a match, it is determined that there is a false hit. The error causing the false hit may be in either the compare data or the input data.

If a step 570 it is determined that it is not the data comparison that produced the hit, then this means that the data comparison yielded a miss, but the checksums matched. The process then proceeds to step 580 where in accordance with a first option it may be assumed that there is the presence of an error condition (in particular a false miss) for the entry. This may be an appropriate assumption to make if it is considered that the likelihood of checksum aliasing is low. However, if the likelihood of checksum aliasing is not considered to be low enough that it can be discounted, then as an alternative option at step 580, the data comparison may be replayed for the entry in question to seek to distinguish between an actual error condition and a true miss condition.

Figure 10:
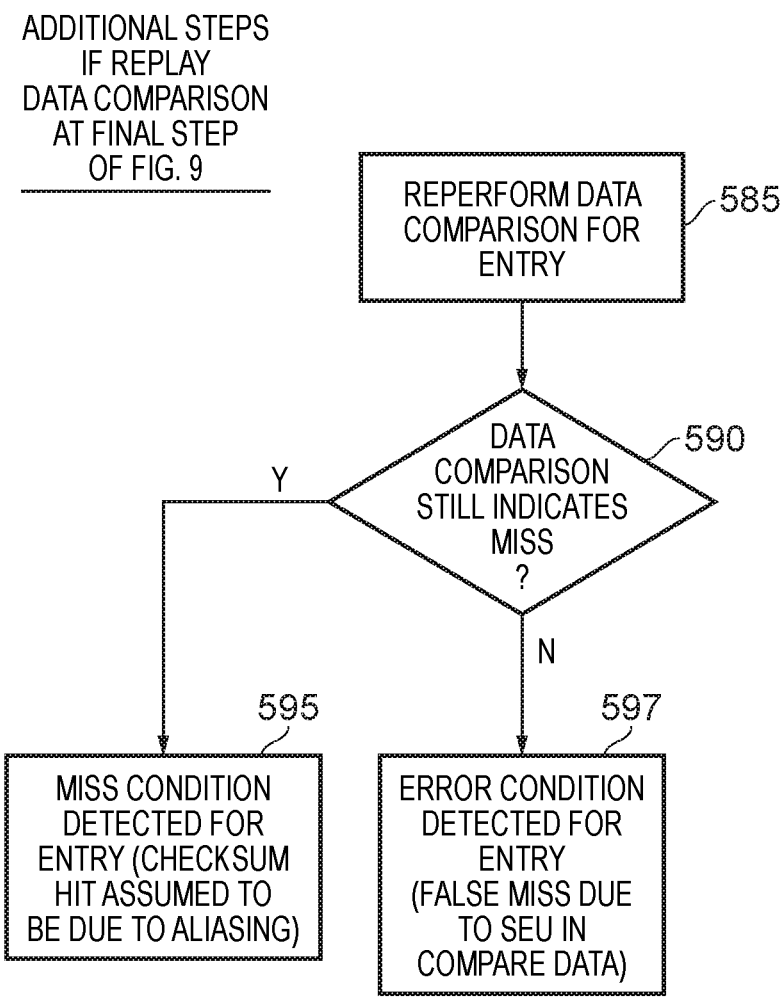
FIG. 10 is a flow diagram illustrating additional steps that may be performed in order to implement the final step of FIG. 9, when it is decided to perform a replay, in accordance with one example.

FIG. 10 is a flow diagram illustrating the additional steps that can be performed at step 580 if it is decided to replay the data comparison. In one example implementation, to seek to mitigate against the performance impact of performing such a replay operation, the processor may be allowed to continue on the assumption that there is a miss at step 580, with the pipeline then being flushed later if the process of FIG. 10 determines that there was actually an error.

At step 585, the data comparison is reperformed for the entry in question, and then at step 590 it is determined whether the data comparison still indicates a miss. If it does, then this is concluded as indicating that there is not a transient error, and instead there is a true miss, and accordingly the process proceeds to step 595 where a miss condition is detected for the entry. In this situation, the checksum hit that was detected in respect of the entry is assumed to be due to aliasing.

If at step 590 the data comparison now indicates a hit, then this does indicate that a transient error condition has been detected for the entry, and this is indicated at step 597. In particular, at this point it is considered that the false miss was due to a single event upset in the data being compared.

FIG. 11 is a table visually illustrating the conclusions reached when adopting the approach of FIGS. 9 and 10, dependent on whether a data comparison hit or a checksum comparison hit is detected.

Figure 12:
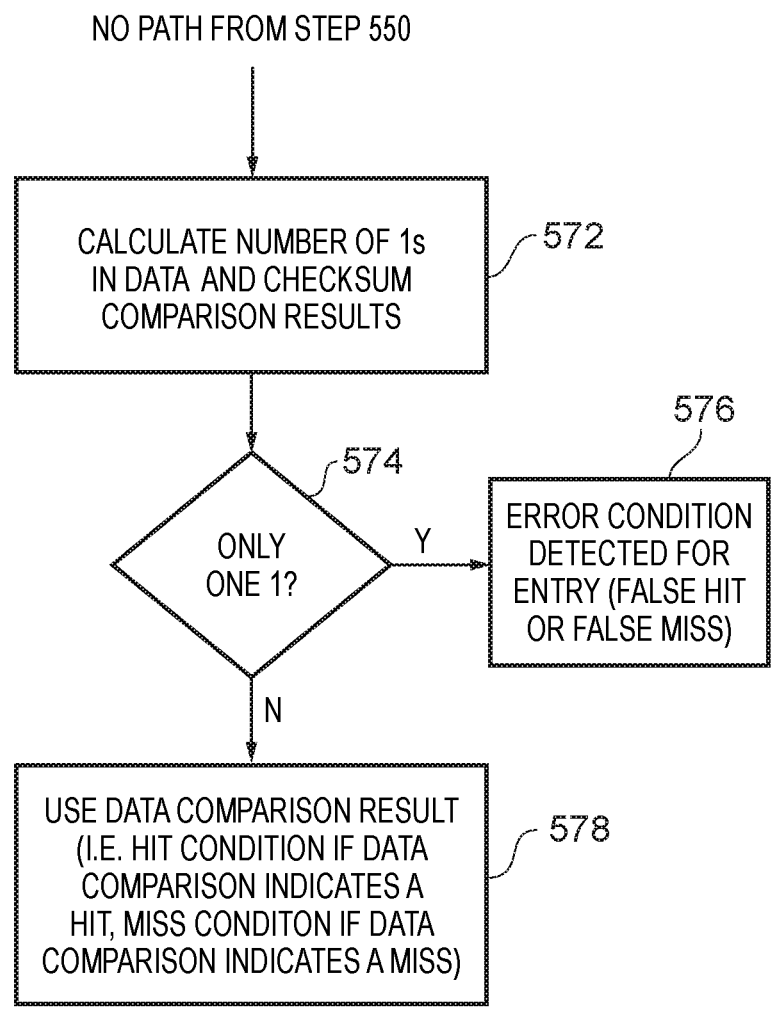
FIG. 12 is a flow diagram illustrating an alternative sequence of steps that can be performed instead of certain steps shown in FIG. 9, in accordance with an alternative implementation.

FIG. 12 is a flow diagram illustrating a sequence of steps that may be performed instead of steps 570, 575 and 580 of FIG. 9, in accordance with an alternative implementation. In particular, as shown, if the no path is taken from step 550 of FIG. 9, then at step 572 the number of occurrences of the value 1 within the data and checksum comparison results can be calculated. Effectively, the data and checksum comparison results can be viewed as a bit vector, and the number of logic 1 values within the bit vector can be determined.

At step 574, it is then detected if only one occurrence of a logic 1 value has been found at step 572. If the discrepancy between the data comparison result and the checksum comparison result determined at step 550 is due to a transient error, then it is expected that there will only be one logic 1 value found at step 572. Hence, if only one logic 1 value is detected, then the process proceeds to step 576, where the error condition is determined to have arisen for the entry. This error may be due to either a false hit or a false miss.

However, if at step 574 it is determined that there is more than one logic 1 value present, then the process proceeds to step 578 where the data comparison result is used to indicate the result for the entry. Hence, a hit condition will be identified if the data comparison indicates a hit, or a miss condition will be identified if the data comparison indicates a miss. Such an approach can provide a higher performance solution than implementing the approach of FIG. 9.

Figure 14:
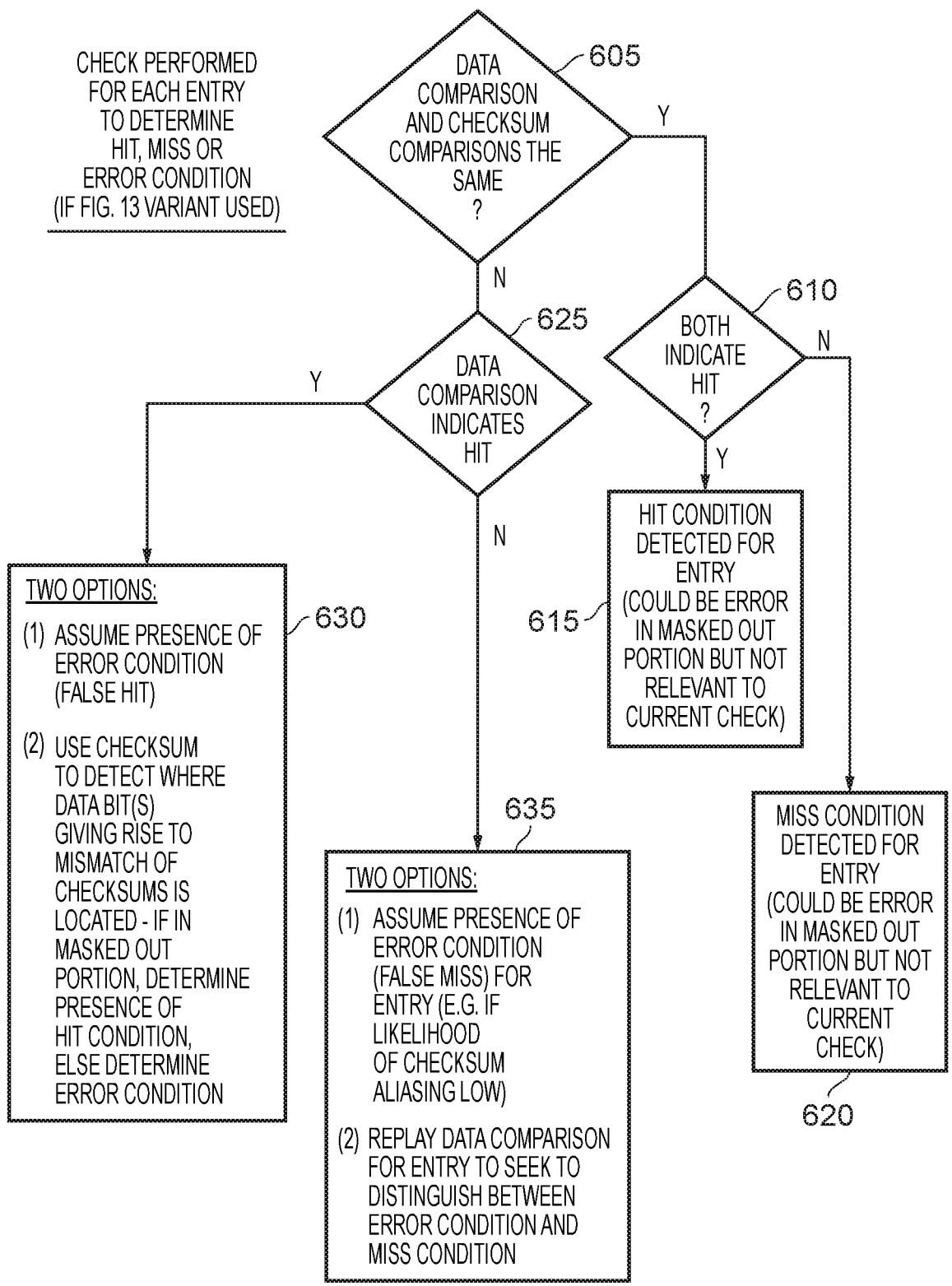
FIG. 14 is a flow diagram illustrating how the approach of FIG. 9 is varied when the implementation of FIG. 13 is employed, in one example arrangement.

In some lookup table structures, for example a TLB, the input provided may include not only input data but also a mask, and the incoming data and the compare data are then masked before the comparison is performed. FIGS. 13 and 14 illustrate a variant of the earlier discussed approach of FIGS. 8 to 10, in such scenarios. As indicated by FIG. 13, at step 600 the process of FIG. 8 can be performed as before, but at step 505 the comparison operation compares the masked input data with the masked compare data. It should be noted in contrast, however, that the checksum comparison still uses the generated checksum for the full input data and compares it with the stored checksum in each entry.

FIG. 14 illustrates how FIG. 9 is modified when the data comparison is performed based on masked input data and masked compare data. Steps 605 and 610 correspond to steps 550 and 555 of FIG. 9. If at step 610 it is determined that both the data comparison and the checksum comparison produce a hit, then at step 615 it is determined that the hit condition has been detected for the entry in question. It should be noted that there could be an error in the masked out portion, i.e. in the portion that has not been subjected to the data comparison, but that is not relevant to the current check. Similarly, if at step 610 it is determined that both the data comparison and the checksum comparison produce a miss, then at step 620 a miss condition is detected for the entry. Again there could be an error in the masked out portion but that is not relevant for the current check.

Steps 625 and 635 correspond to the earlier discussed steps 570 and 580 of FIG. 9. Further, if the replay mechanism is used at step 635, then the process of the earlier discussed FIG. 10 can be performed, but again the data comparison will compare the masked input data with the masked compare data.

If at step 625 it is determined that the data comparison has indicated a hit but the checksum comparison has not, then the process proceeds to step 630. Here, there are two possible options. The first is to assume the presence of an error condition (i.e. a false hit due to a single event upset in the data being compared).

However, alternatively a further check can be performed at step 630, and in particular the checksum information can be used to detect the location of the data bit(s) giving rise to the mismatch in the checksums. In one implementation the stored checksum is used here as such a checksum is from the full tag data. If it is determined that the location of the relevant data bit(s) is in the masked out portion, then in fact this means that there is a hit for the data portion of interest, and accordingly the presence of a hit condition can be indicated. However, otherwise, the error condition is indicated, identifying the presence of a false hit.

FIG. 15 is a table visually indicating the conclusions reached when adopting the approach of FIG. 14, dependent on the presence or absence of a masked data comparison hit and the presence or absence of a checksum comparison hit.

It has been found that such an approach can be very useful for providing fault resilience for particular types of lookup table structures, without needing to replicate the combinational circuitry. For example it may provide a fault resilient TLB or networking CAM design.

The techniques described herein provide a significantly more area and energy efficient design for providing resilience to faults, thereby enabling use in systems needing to conform to certain functional safety requirements. Whilst table content itself can be relatively easily protected with well known parity or ECC checksum redundant information, in typical known systems full duplication of components is typically resorted to in order to protect the associated combinational circuitry used to perform the processing or comparison operations performed based on the table contents. However, such approaches typically result in high area and power consumption overhead, and this is alleviated using the techniques described herein which avoid full duplication of the combinational circuitry, while still providing a suitable level of fault tolerance to enable their use in safety critical designs.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   storage to provide a plurality of compare data blocks;
   processing circuitry responsive to receipt of input data to perform, for each compare data block, a processing operation using the input data and the compare data block to produce a match condition indication for that compare data block, the apparatus being configured such that, in expected operation, performance by the processing circuitry of the processing operation for each compare data block will result in one match condition indication indicating a match, and all other match condition indications indicating absence of a match; and
   evaluation circuitry arranged to evaluate the match condition indications produced for the plurality of compare data blocks in order to produce an outcome indication;
   wherein the evaluation circuitry is arranged, in the presence of one match condition indication indicating a match, and all other match condition indications indicating absence of a match:
      to perform a false hit check procedure in order to check for presence of a false hit; and
      in the presence of the false hit to produce an error indication as the outcome indication, and otherwise to produce a hit indication as the outcome indication.

2. An apparatus as claimed in claim 1, wherein the evaluation circuitry is arranged, in the presence of more than one match condition indication indicating a match, to produce the error indication as the outcome indication.

3. An apparatus as claimed in claim 1, wherein the evaluation circuitry is arranged, when none of the match condition indications indicates a match:
   to perform a false miss check procedure by causing the processing circuitry to reperform, for each compare data block, the processing operation using the input data and the compare data block to produce a duplicate match condition indication for that compare data block; and
   to produce a transient error condition as the outcome indication when any of the duplicate match condition indications indicates a match.

4. An apparatus as claimed in claim 3, wherein the evaluation circuitry is arranged, when none of the duplicate match condition indications indicates a match, to perform a further check procedure, and to produce as the outcome indication a programming error indication or a hardware fault indication dependent on an outcome of the further check procedure.

5. An apparatus as claimed in claim 4, wherein:
   each compare data block comprises a single compare data item;
   the processing circuitry is arranged to perform, as the processing operation for each compare data block, a compare operation to compare the input data with the single compare data item of that compare data block;
   the storage circuitry is arranged to provide, in association with each single compare data item, associated checksum data; and
   the evaluation circuitry is arranged to perform the false hit check procedure by causing checksum data generated for the input data to be compared with the checksum data for the single compare data item associated with the match condition indication indicating the match, in order to produce a checksum match indication, and to determine presence of the false hit when the checksum match indication indicates absence of a match.

6. An apparatus as claimed in claim 5, wherein the evaluation circuitry is arranged to perform the further check procedure by:
   for each single compare data item, causing checksum data to be generated for that compare data item and compared with stored checksum data; and in the event that the generated checksum data does not match the stored checksum data for at least one single compare data item, producing as the outcome indication the hardware fault indication, and otherwise producing as the outcome indication the programming error indication.

7. An apparatus as claimed in claim 5, wherein each single compare data item comprises a base address indication for a memory region that is aligned to a specified size, and the input data comprises a portion of an address selected based on the specified size.

8. An apparatus as claimed in claim 5, wherein the storage is arranged as content addressable memory.

9. An apparatus as claimed in claim 4, wherein:
   each compare data block comprises bounds information for a memory region;
   the input data comprises a memory address;
   the processing circuitry is arranged to perform, as the processing operation for each compare data block, an arithmetic operation to determine, with reference to the bounds information, whether the memory address is within the associated memory region;
   the apparatus comprises additional processing circuitry; and
   the evaluation circuitry is arranged to perform the false hit check procedure by reperforming within the additional processing circuitry the arithmetic operation for the compare data block associated with the match condition indication indicating the match, in order to produce a further match condition indication, and to determine presence of the false hit when the further match condition indication indicates absence of a match.

10. An apparatus as claimed in claim 9, wherein the evaluation circuitry is arranged to perform the further check procedure by:
    employing the additional processing circuitry to reperform the arithmetic operation for each compare data block to produce a plurality of reference match condition indications; and
    in the event that any of the reference match condition indications indicates a match, producing as the outcome indication the hardware fault indication, and otherwise producing as the outcome indication the programming error indication.

11. An apparatus comprising:
    a storage region comprising a plurality of entries, each entry arranged to store compare data and checksum data for the compare data;
    comparison circuitry responsive to receipt of input data to perform, for each entry within the storage region, a comparison operation comprising comparing at least a portion of the input data with at least a corresponding portion of the compare data stored in that entry to produce a data match indication, and comparing checksum data generated from the input data with the checksum data stored in that entry to produce a checksum match indication; and
    evaluation circuitry arranged, for each entry, to evaluate both the data match indication and the checksum match indication in order to produce one of a hit indication, a miss indication and an error indication for that entry.

12. An apparatus as claimed in claim 11, wherein the evaluation circuitry is arranged, when both the data match indication and the checksum match indication indicate a match, to produce the hit indication for the entry.

13. An apparatus as claimed in claim 11, wherein the evaluation circuitry is arranged, when both the data match indication and the checksum match indication indicate absence of a match, to produce the miss indication for the entry.

14. An apparatus as claimed in claim 11, wherein the evaluation circuitry is arranged, when the data match indication indicates a match, but the checksum match indication indicates absence of a match, to produce the error indication for the entry.

15. An apparatus as claimed in claim 11, wherein the evaluation circuitry is arranged, when the data match indication indicates absence of a match, but the checksum match indication indicates a match, to produce the error indication for the entry.

16. An apparatus as claimed in claim 11, wherein the evaluation circuitry is arranged, when the data match indication indicates absence of a match, but the checksum match indication indicates a match:
    to cause the comparison circuitry to reperform the comparing of the at least a portion of the input data with the at least a corresponding portion of the compare data stored in that entry to produce a duplicate data match indication; and
    to produce the miss indication for the entry if the duplicate data match indication also indicates absence of a match, and otherwise to produce the error indication.

17. An apparatus as claimed in claim 11, wherein when the data match indication and the checksum match indication differ, the evaluation circuitry is arranged to analyse a number of logic 1 values in the data match indication and the checksum match indication in order to determine whether the error indication is to be produced.

18. An apparatus as claimed in claim 11, wherein, for each entry, the comparison operation comprising comparing all of the input data with all of the compare data stored in the entry to produce the data match indication.

19. An apparatus as claimed in claim 11, wherein the input data is subjected to a mask operation to produce a subset of the input data, and for each entry the comparison operation comprises comparing the subset of the input data with a corresponding subset of the compare data stored in that entry to produce the data match indication.

20. An apparatus as claimed in claim 19, wherein the evaluation circuitry is arranged, when the data match indication indicates a match, but the checksum match indication indicates absence of a match:
    to employ the checksum data to identify a location within the input data that gave rise to the checksum match indication indicating absence of the match;
    to produce the error indication when the location is within the subset of the input data, and otherwise to produce a hit condition.

21. An apparatus as claimed in claim 11, wherein the storage region forms a lookup table.

22. An apparatus as claimed in claim 11, wherein the storage region is one of:
    a fully associative cache;
    a selected set within a set associative cache.

23. A method of detecting errors within an apparatus, comprising:
    maintaining in storage a plurality of compare data blocks;
    performing, responsive to receipt of input data, for each compare data block, a processing operation using the input data and the compare data block to produce a match condition indication for that compare data block, the apparatus being configured such that, in expected operation, performance of the processing operation for each compare data block will result in one match condition indication indicating a match, and all other match condition indications indicating absence of a match; and evaluating the match condition indications produced for the plurality of compare data blocks in order to produce an outcome indication, and in presence of one match condition indication indicating a match, and all other match condition indications indicating absence of a match:
- performing a false hit check procedure in order to check for presence of a false hit; and
- in the presence of the false hit producing an error indication as the outcome indication, and otherwise producing a hit indication as the outcome indication.

24. A method of detecting errors in an apparatus comprising:

providing a storage region comprising a plurality of entries, where each entry stores compare data and checksum data for the compare data;

performing, responsive to receipt of input data, for each entry within the storage region, a comparison operation comprising comparing at least a portion of the input data with at least a corresponding portion of the compare data stored in that entry to produce a data match indication, and comparing checksum data generated from the input data with the checksum data stored in that entry to produce a checksum match indication; and evaluating, for each entry, both the data match indication and the checksum match indication in order to produce one of a hit indication, a miss indication and an error indication for that entry.

* * * * *